United States Patent Office 3,302,584
Patented Feb. 7, 1967

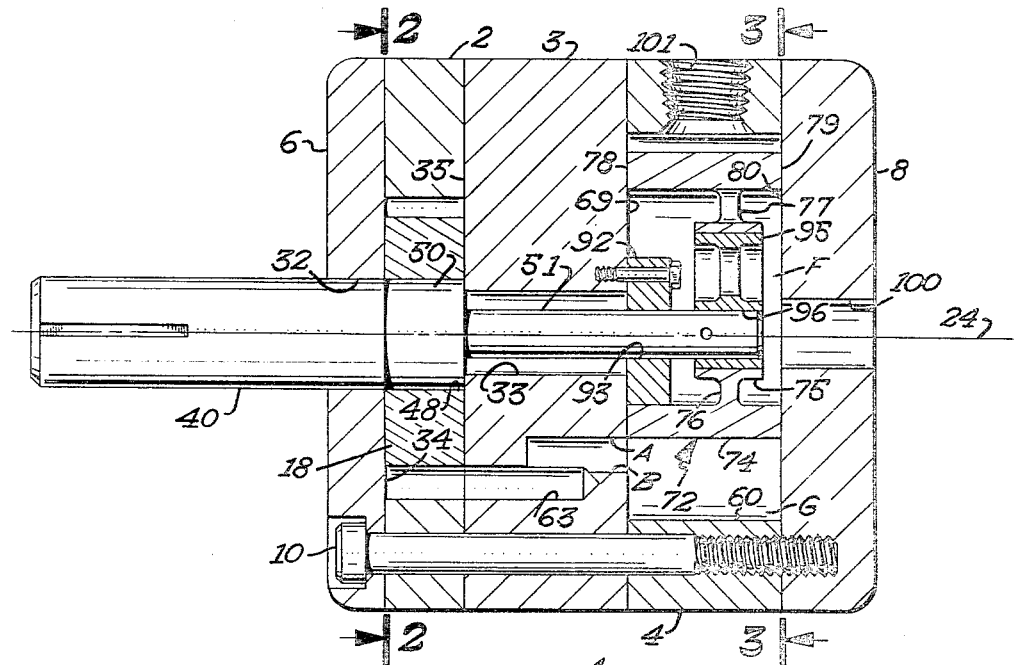
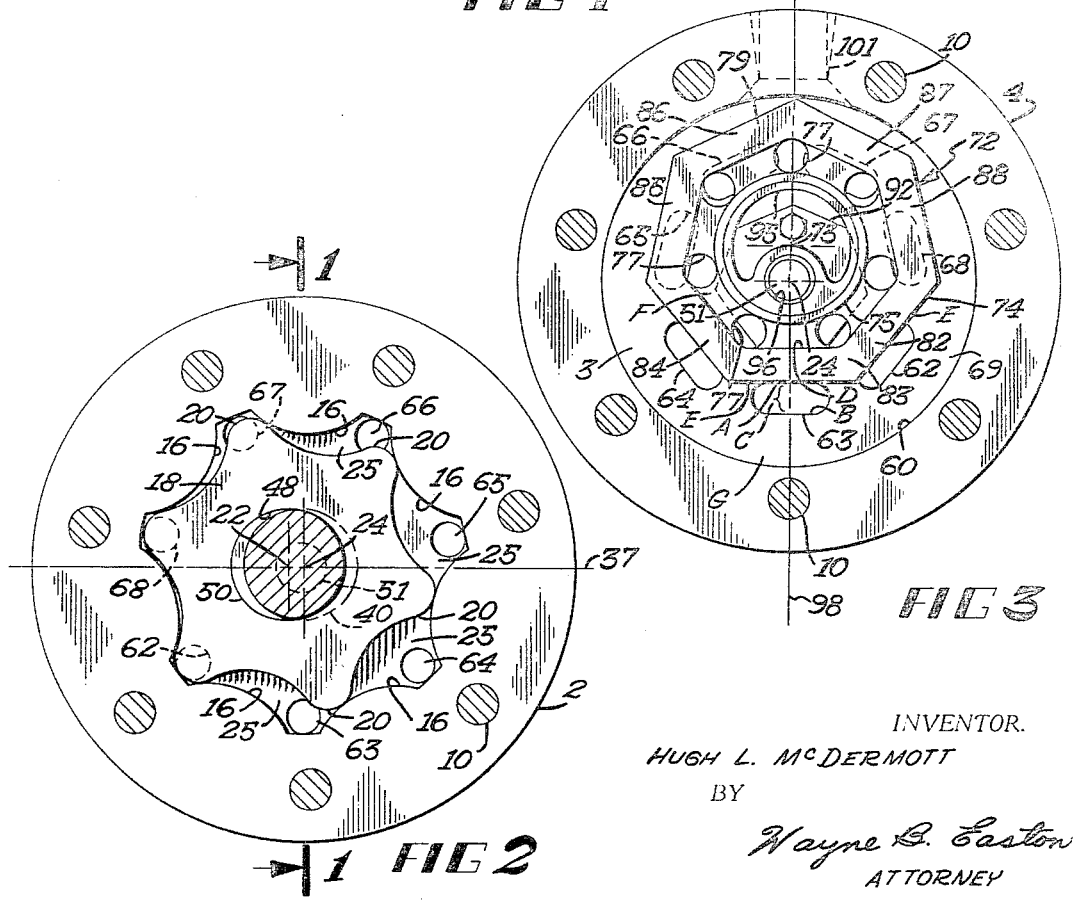

3,302,584
VALVING ARRANGEMENT FOR FLUID
PRESSURE DEVICE
Hugh L. McDermott, Minneapolis, Minn., assignor to
Char-Lynn Company, Minneapolis, Minn., a corporation of Minnesota
Filed Sept. 1, 1965, Ser. No. 484,181
4 Claims. (Cl. 103—130)

This invention relates to fluid pressure devices such as pumps, motors and meters and more particularly to fluid passage porting and valving arrangements for such devices.

In a fluid pressure device of the type described herein there are passages in the casing which are periodically closed and opened by an orbiting type of valve. In flowing into and out of the casing passages, the fluid flows through openings in a surface which is in sliding engagement with a plane surface of the valve which periodically crosses and closes the openings.

A main object of the invention is to provide a fluid pressure device of the type described above having a new and improved valving arrangement wherein port openings in the casing may be relatively larger than corresponding port openings in comparable prior art devices.

Other objects and advantages will become apparent from the following specification, appended claims and attached drawing.

In the drawings:

FIG. 1 is a longitudinal sectional view of a fluid pressure motor or pump embodying the invention and taken on line 1—1 of FIG. 2;

FIG. 2 is a transverse sectional view taken on line 2—2 of FIG. 1; and

FIG. 3 is a transverse sectional view taken on line 3—3 of FIG. 1.

In the illustrated embodiment of the invention there is provided a casing comprising a generally cylindrically and annularly shaped gerotor section 2, a cylindrically and annularly shaped fluid passage section 3, a cylindrically and annularly shaped valve section 4, an end cover plate 6 and an end cover plate 8. Casing sections 2, 3 and 4 and end cover plates 6 and 8 are held together in axial alignment by a plurality of circumferentially spaced bolts 10.

With reference to FIGS. 1 and 2, the gerotor casing section 2, which may be referred to as a ring member 2, has a plurality of internal teeth 16. An externally toothed star member 18, having at least one fewer teeth 20 than ring member 2, is disposed eccentrically in the chamber or space formed and surrounded by ring member 2. Star member 18 has an axis 22 which is moveable in an orbital path about the axis 24 of ring member 2. During orbital movement of star member 18 the teeth 20 thereof intermesh with the ring member teeth 16 to form expanding and contracting cells or chambers 25 which are equal in number to the number of teeth 20 of star member 18.

End cover 6 and casing section 3 have bores 32 and 33 which are concentric relative to ring axis 24 and are of small enough diameter so that the resulting annular faces 34 and 35 which abut gerotor casing section 2 form sides for the gerotor chamber so that the expanding and contracting cells 25 formed between the teeth of the gerotor star and ring members 18 and 2 will be closed for all orbital positions of the star member 18.

With further reference to FIG. 2, a horizontal centerline 37 incidentally represents the line of eccentricity for the star member 18 for that particular position of the star member relative to the ring member 2. This line of eccentricity is defined herein as a line which is perpendicular to and intersects the star and ring axes 22 and 24 for all orbital positions of the star 18. During orbital movement of the star member 18, assuming the orbital movement is clockwise, the cells 25 on the top side of the line of eccentricity 37 would be contracting and the cells 25 on the bottom side would be expanding. If the orbital movement were counterclockwise the reverse would be true. In the operation of the device illustrated, fluid under pressure is directed to the expanding cells on one side of the line of eccentricity and exhausted from the contracting cells on the other side of said line. The valving arrangement which facilitates the feeding and exhausting of the cells 25 will be described further on herein.

With reference to FIG. 1, drive shaft 40, which is concentric relative to ring axis 24, is rotatably disposed in cover plate bore 32. The shaft 40 may be driven by an electric motor or the like when the device is utilized as a pump or may drive apparatus such as a boat propeller when the device is utilized as a motor.

Star member 18 has a bore 48 which is concentric relative to the axis 22 thereof. Shaft 40 has a cylindrically shaped eccentric portion 50 which is rotatably disposed in star bore 48 and an extended shaft portion 51 which is concentric relative to the axis 24. Star member 18 is eccentrically disposed relative to ring member 2, as mentioned above. In operation a star member 18 having six teeth will make one revolution about its own axis 22 for every six times the star member orbits in the opposite direction about the axis 24 of the ring member 2. The eccentric portion 50 of shaft 40 orbits about the ring axis 24 at the same orbital speed that star 18 orbits about axis 24 and accordingly shaft 40 is rotatable in synchronism with the orbital motion of star 18 and at the same speed as the orbital motion of star 18. When the device is utilized as a pump, star member 18 will be orbited relative to axis 24 by a turning force applied to shaft 40 and transmitted to star 18 through eccentric portion 50. When the device is used as a motor, the force created by the orbiting of star 18 about axis 24 will be transmitted to shaft 40 through eccentric portion 50 to cause turning of shaft 40.

Valve casing section 4 has a bore 60 which may be concentric relative to the axis 24 of the device. Bore 60 defines a cylindrically shaped chamber which will be referred to as a valve chamber 60. Casing section 3 has a plurality of axially extending, circumferentially arranged and spaced valve passages 62 to 68 illustrated as being seven in number which is equal to the number of teeth of the ring member 2. Passages 62 to 68 are arranged at equal distances from axis 24 and extend axially from points between the ring member teeth 16, in the chamber formed by ring member 2, to the valve chamber 60. The shape of each passage 62 to 68 as illustrated has a portion adjacent ring member 2 which is circular in section and has a portion adjacent valve chamber 60 which is elongated in section with parallel sides such as the sides A and B of passage 63. Sides A and B of each elongated opening are tangent to concentric circles (not shown) which have centers which are coincident with the axis 24. An effective or significant dimension of each opening is the distance C indicated in FIG. 3 for the opening of passage 63 which is on a radial line 98 which extends through axis 24 and is perpendicular to the parallel sides A and B of the opening 63. The openings of passages 62 to 68 in surface 69 are circumferentially arranged relative to axis 24 and are in equally spaced relation to each other.

Disposed in valve chamber 60 is a generally ring shaped valve 72 having two main parts concentric relative to the axis 73 of ring valve 72 which are an annulus 74 and a hub 75. A web portion 76 which connects the hub and the annulus has a series of circumferentially arranged openings 77. Annulus 74 has generally annular surfaces 78 and 79 on opposite sides thereof which are in slidable and abutting engagement respectively with the flat surface 69 of casing section 3 and the flat surface 80 of cover plate 8. Annular surface 78 of ring valve 72 is formed so that it would be just sufficient to cover the openings in surface 69 of all the valve passages 62 to 68 if ring valve 72 were positioned concentrically relative to axis 24. Ring valve 72 cannot assume that position in the operation of the device, however, because ring valve 72 is disposed eccentrically in valve chamber 60 relative to axis 24 and in operation has an orbital path about the device axis 24.

Annulus 74 has polygonal sides 82 to 88 equal in number to the passages 62 to 68. The width of each of the sides 82 to 88 is approximately equal to or slightly larger than the radial dimension of each passage opening such as the radial dimension C of the opening of passage 63. Each of the polygonal sides 82 to 88 has parallel edges such as the parallel edges D and E of polygonal side 83.

A valve restraining member 92 having a polygonal shape with the same number of sides as ring valve 72 is fixedly attached to surface 69 of casing section 3. Valve restraining member 92 has a central bore 93 which is concentric relative to the axis 24 and is arranged relative to the openings of passages 62 to 68 in the surface 69 of casing section 3 so that the sides of member 92 are respectively parallel to the sides of the openings of the corresponding passages 62 to 68 such as the sides A and B of passage 63.

A driving connection is provided between shaft 40 and ring valve 72 which comprises the shaft extension 51 and a cylindrically shaped crank 95. Shaft extension 51 is journalled in the bore 93 of valve restraining member 92 and fixedly attached to the crank 95. Crank 95 is rotatably mounted in the hub 75 of ring valve 72 and has an eccentric bore 96 which receives the shaft extension 51. The axis of rotation of crank 95 is coincident with the axis of shaft extension 51 and axis 24 and the crank is rotatable about axis 24.

During operation of the device the orbital movement of star 18 will cause rotation of crank 95 about axis 24 which will cause ring valve 72 to orbit in unison with star 18. Crank 95 is angularly displaced 90 degrees relative to shaft eccentric 50 which is rotatably disposed in the star bore 48 so that although the star 18 and ring valve 72 orbit in unison, the orbiting of the ring valve 72 will be 90 degrees out of phase relative to the orbiting of the star 18. Stated another way, the line of eccentricity 98 of the ring valve 72 (see FIG. 3) is displaced 90 degrees relative to the line of eccentricity 37 of the star 18.

End plate 8 and casing section 4 are provided with inlet and outlet ports 100 and 101, respectively. Either of the ports 100 or 101 may be the inlet port depending on the direction of rotation desired for the shaft 40. For convenience, port 100 will be referred to herein as the inlet port and port 101 will be referred to as the outlet port.

Ring valve 72 divides the valve chamber 60 into two noncommunicating chambers F and G which may be referred to as interior and exterior valve chambers and which are separated by the ring valve annulus 74. Fluid inlet port 100 is in fluid communication with interior valve chamber F and outlet port 101 is in fluid communication with exterior valve chamber G. Interior valve chamber F includes the spaces on both sides of ring valve web 76 in that the web openings 77 are provided to allow fluid to flow from fluid inlet port 100 to valve passages 62 to 68 and vice versa.

The orbital movement of ring valve 72 relative to the valve passages 62 to 68 is such that at any instant, as may be noted in FIG. 3, some of the passages communicate with the interior valve chamber F and some of the passages communicate with the exterior valve chamber G.

At the instant when valve 72 is in the position shown in FIG. 3, for example, passages 62 to 64 are in communication with the exterior valve chamber G and passages 65 to 68 are in communication with the interior valve chamber F. Assuming the star 18 and ring valve 72 to be in the positions shown, fluid admitted through inlet port 100 flows to interior valve chamber F, through valve passages 65 to 68 to gerotor cells above the line of eccentricity 37 (see FIG. 2) which are expanding, from gerotor cells below the line of eccentricity 37 which are contracting, through valve passages 62 to 64 to the exterior valve chamber G and out through the fluid outlet 101.

The orbiting of star 18 causes ring valve 72 to be orbited at the same speed that star 18 orbits and in the same direction. The orbiting of ring valve 72 sequentially exposes valve passages on one side of the line of eccentricity 37 (see FIG. 2) to the interior valve chamber F and simultaneously sequentially exposes valve passages on the other side of the line of eccentricity 37 to the exterior valve chamber G. As ring valve 72 orbits in unison with star 18, expanding gerotor cells on one side of the line of eccentricity 37, which rotates about the axis 24 at the same speed that the start orbits about axis 24, will always be in fluid communication with the fluid inlet port 100 and contracting gerotor cells on the other side of the line of eccentricity will always be in fluid communication with the fluid outlet port 101. In effect the ring valve 72 is indexed relative to the star 18 and, as the ring valve 72 and star 18 orbit in unison, the feeding and exhausting of the gerotor cells will always be on opposite sides of the line of eccentricity 37 for all orbital positions of the star 18 and ring valve 72.

Valve restraining member 92 has the main function of preventing ring valve 72 from rotating about its own axis 73. Valve restrainer 92 is angularly indexed so that it is symmetrically arranged relative to the openings in surface 69 of passages 62 to 68 and so that its sides are respectively parallel to the sides of such openings. When ring valve 72 is caused to be orbited by the operation of crank 95, the inner edges D of its sides 82 to 88 will successively move into abutting engagement with corresponding sides of valve restrainer 92 so as to prevent ring valve 72 from rotating. In order to perform its function, valve restrainer 92 must be of a predetermined size with respect to (1) the distance that valve axis 73 is eccentric relative to axis 24 and (2) the size of the polygon formed by the inner edges D of the valve sides 82 to 88.

The openings in surface 69 of passages 62 to 68 must be arranged a predetermined distance from axis 24 to permit the full opening and closing of each of the passages 62 to 68 once during each cycle of operation. In this respect it may be noted in FIG. 3 that for the position of ring valve 72 shown, the outer edge E of side 83 is coincident with the inner side A of valve passage 63 to cause that passage to be fully open for that position of the valve 72. Passage 63 will also be fully open when valve 72 is displaced 180 degrees from the position shown in FIG. 3, because in that position the inner edge D of valve side 83 will be coincident with the outer side B of passage 63.

Other forms of valve restrainer means could be provided within the scope of the invention which would have the function of permitting orbital movement of valve 72 and preventing rotation of the valve 72 about its own axis. Valve restrainer 92 controls the motion of ring valve 72 by being positioned in the interior of ring valve 72 but a valve restrainer could be provided, for example, which would have a surrounding relationship to ring valve 72 and perform in a manner analogous to the valve restrainer 92. Thus an annulose type of valve restrainer could be provided in addition to valve restrainer 92 or instead of valve restrainer 92. A universal joint type of shaft could also be provided which would permit orbital movement but prevent rotational movement of ring valve 72.

In accordance with the present invention the polygonal shape of ring valve 72 and the elongated form of openings shown in FIG. 3 for passages 62 to 68 permits an arrangement whereby said openings may be relatively large in area compared to port openings in comparable prior art devices and thus a rapid supplying and exhausting of fluid to and from passages 62 to 68 is facilitated.

A consideration of the cooperation during operation of the device between the polygonal side 83 of the valve 72 with the opening of passage 63 in the surface 69 will illustrate the mode of operation of the valving arrangement. The side 83 only has orbital movement and during such orbital movement the edges D and E of valve side 83 are always parallel to the edges A and B of opening 63. The eccentricity of valve 72 relative to axis 24 is predetermined so that when valve 72 is in its up position as shown in FIG. 3, the valve edge E is colinear with the opening edge A and when the valve 72 is in its down position the valve edge D will be colineal with the opening edge B. The eccentricity of valve 72 is thus equal to the dimension C of opening 63 and the width of the opening may thus be as large as the eccentricity. It is noted above that the shape of the opening is defined as being "elongated." As the term "elongated" is used herein it means that the length of a port opening in the casing surface 69 is longer than its width which is indicated by the dimension C.

It will be understood that the invention relates broadly to a valving arrangement for feeding fluid to and exhausting fluid from a fluid pressure device of the expansible chamber type and is not limited to being used with a gerotor which is only one type of an expansible chamber device. Other types of expansible chamber devices with which the valving arrangement may be used are sliding vane type of pumps and motors and reciprocating piston and cylinder arrangements used in barrel type pumps and reciprocating engines.

The invention relates in particular to a new and improved ring valve which performs the feeding and exhausting functions while moving in an orbital path in synchronism with the movement of the means provided for forming the expanding and contracting chambers. The ring valve can have any angular displacement relative to the expansible and contractible chamber forming means if a fluid passage arrangement is provided so that the fluid feeding and exhausting can be separated relative to the interior and exterior chambers of the valve.

While one embodiment of the invention is described here, it will be understood that it is capable of modification, and that such modification, including a reversal of parts, may be made without departure from the spirit and scope of the invention as defined in the claims.

What I claim is:

1. In a fluid pressure device, casing means, said casing defining internally thereof a flat wall surface and a plurality of passages, said passages having equally spaced openings in said wall surface arranged circumferentially relative to a reference axis, chamber forming means for forming expanding and contracting chambers having fluid communication with said passages, generally ring shaped valve means eccentrically disposed relative to said axis and having an end surface slidably engaging said casing wall surface, said valve means cooperating with said casing to define interior and exterior valve chambers, drive means between said chamber forming means and said valve means for orbiting said valve means about said axis in synchronism with said chamber forming means, said openings being spaced from said axis so that upon orbiting of said valve means said openings connected to said expanding chambers have fluid communication with one of said valve chambers and said openings connected to said contracting chambers have fluid communication with the other of said valve chambers, said valve means having equilateral polygonal sides with each side having parallel edges, said sides being equal in number to said openings, said openings being elongated and arranged tangentially to a circle having its center coincident with said axis, each of said openings having parallel sides, valve restraining means for limiting the movement of said valve to only orbital movement relative to said axis, said valve means being indexed relative to said openings by said valve restraining means so that each of said valve sides are parallel to a corresponding one of said openings during said orbital movement of said valve means, and said casing having fluid inlet and outlet means in respective fluid communication with said interior and exterior valve chambers.

2. A fluid pressure device according to claim 1 wherein said valve restraining means is polygonal with the same number of sides as said valve means and is disposed in said interior valve chamber in fixed relation to said casing.

3. A fluid pressure device according to claim 1 wherein the width of each of said valve sides is substantially equal to the distance said valve means is eccentrically disposed relative to said axis.

4. A fluid pressure device according to claim 3 wherein said distance said valve means is eccentrically disposed relative to said axis is at least as great as the width of each of said elongated openings.

References Cited by the Examiner

UNITED STATES PATENTS

| Re. 25,126 | 2/1962 | Charlson | 91—56 |
| Re. 25,291 | 12/1962 | Charlson | 91—56 |
| 2,871,831 | 2/1959 | Patin | 103—126 |
| 2,912,937 | 11/1959 | Insley | 103—126 |
| 3,087,436 | 4/1963 | Dettloff et al. | 103—130 |
| 3,215,043 | 11/1965 | Huber | 230—145 |

DONLEY J. STOCKING, *Primary Examiner.*

W. J. GOODLIN, *Assistant Examiner.*